(12) United States Patent
Ren et al.

(10) Patent No.: US 11,251,656 B2
(45) Date of Patent: Feb. 15, 2022

(54) COILS FOR WIRELESS POWER SYSTEMS

(71) Applicant: Apple Inc., Cupertino, CA (US)

(72) Inventors: Saining Ren, Auckland (NZ); Ho Fai Leung, Auckland (NZ); Liang Chen, Auckland (NZ)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/503,394

(22) Filed: Jul. 3, 2019

(65) Prior Publication Data

US 2020/0321807 A1 Oct. 8, 2020

Related U.S. Application Data

(60) Provisional application No. 62/828,931, filed on Apr. 3, 2019.

(51) Int. Cl.

| | | |
|---|---|---|
| *H02J 50/12* | (2016.01) | |
| *H02J 50/40* | (2016.01) | |
| *H02J 7/02* | (2016.01) | |
| *H02M 7/12* | (2006.01) | |
| *H01F 27/24* | (2006.01) | |

(Continued)

(52) U.S. Cl.
CPC ............ *H02J 50/12* (2016.02); *H01F 27/02* (2013.01); *H01F 27/24* (2013.01); *H01F 27/2823* (2013.01); *H02J 7/025* (2013.01); *H02J 50/40* (2016.02); *H02M 7/12* (2013.01)

(58) Field of Classification Search
CPC .. H02J 50/12; H02J 50/60; H02J 50/70; H02J 50/10; H02J 50/40; H02J 50/90; H02J 7/00; H02J 7/02; H02J 7/025; H02J 5/005; H01F 27/28; H01F 38/14; H04B 5/00; H02M 3/335; H02M 3/337
USPC ........................ 307/104, 149, 66, 64, 80, 82
See application file for complete search history.

(56) References Cited

U.S. PATENT DOCUMENTS

| | | |
|---|---|---|
| 1,004,229 A | 9/1911 | Ethelbert |
| 6,992,952 B2 | 1/2006 | Endo et al. |
| 8,847,839 B2 | 9/2014 | Nakamura et al. |

(Continued)

FOREIGN PATENT DOCUMENTS

| | | |
|---|---|---|
| CN | 101425705 A | 5/2009 |
| CN | 202957669 U | 5/2013 |

(Continued)

*Primary Examiner* — Hal Kaplan
*Assistant Examiner* — Thai H Tran
(74) *Attorney, Agent, or Firm* — Treyz Law Group, P.C.; G. Victor Treyz; Michael H. Lyons (57) ABSTRACT

A wireless power system has a wireless power transmitting device and a wireless power receiving device. The wireless power transmitting device may be a wireless charging mat with one or more coils or may be a wireless charging puck with one or more coils. In some embodiments, the wireless charging puck may have six coils or other number of coils arranged in a ring. The wireless power receiving device may have an elongated magnetic core such as a C-shaped core with pillars at opposing ends. First and second coils may be formed on the pillars and a third coil may be formed between the first and second coils. The coils of the wireless power receiving device such as the first and second coils on the magnetic core may be configured to receive magnetic flux emitted by a pair of the six coils in the wireless charging puck.

20 Claims, 12 Drawing Sheets

(51) Int. Cl.
    *H01F 27/28*       (2006.01)
    *H01F 27/02*       (2006.01)

(56)                 References Cited

U.S. PATENT DOCUMENTS

| | | |
|---|---|---|
| 8,922,066 B2 | 12/2014 | Kesler et al. |
| 9,318,780 B2 | 4/2016 | Robertson et al. |
| 9,793,718 B2 | 10/2017 | Chiyo |
| 9,912,174 B2 | 3/2018 | Soar |
| 10,340,705 B2 | 7/2019 | Li et al. |
| 2007/0222453 A1* | 9/2007 | Reiderman .............. G01V 3/28 324/333 |
| 2013/0175874 A1 | 7/2013 | Lou et al. |
| 2017/0256992 A1* | 9/2017 | Badr ....................... H02J 50/60 |
| 2017/0353061 A1 | 12/2017 | Maniktala |
| 2018/0062416 A1* | 3/2018 | Terry ...................... H02M 7/32 |
| 2018/0069600 A1* | 3/2018 | Kowalski ............ H01F 27/2823 |
| 2018/0069601 A1* | 3/2018 | Qiu .................... H01F 27/2823 |
| 2018/0123392 A1* | 5/2018 | Pinciuc .................. H01F 27/24 |
| 2018/0233961 A1 | 8/2018 | Hu et al. |

FOREIGN PATENT DOCUMENTS

| | | | |
|---|---|---|---|
| CN | 108886270 A | 11/2018 | |
| KR | 20170100249 A | 9/2017 | |
| WO | WO-2016048008 A1 * | 3/2016 | ................ H02J 7/00 |
| WO | WO-2016048008 A1 * | 3/2016 | ................ H02J 7/00 |

\* cited by examiner

COILS FOR WIRELESS POWER SYSTEMS

This application claims the benefit of provisional patent application No. 62/828,931, filed Apr. 3, 2019, which is hereby incorporated by reference herein in its entirety.

FIELD

This relates generally to power systems, and, more particularly, to wireless power systems for charging electronic devices.

BACKGROUND

In a wireless charging system, a wireless power transmitting device such as a charging mat or charging puck wirelessly transmits power to a wireless power receiving device such as a portable electronic device. The portable electronic device has a coil and rectifier circuitry. The coil of the portable electronic device receives alternating-current wireless power signals from a coil in the wireless charging mat. The rectifier circuitry converts the received signals into direct-current power.

SUMMARY

A wireless power system has a wireless power transmitting device and a wireless power receiving device. During operation, the wireless power transmitting device transmits wireless power to the wireless power receiving device. The wireless power receiving device receives the wireless power using coils and rectifier circuitry. The rectifier circuitry supplies a corresponding output voltage to a load.

The wireless power transmitting device may be a wireless charging mat with one or more coils or may be a wireless charging puck with one or more coils. In some embodiments, the wireless charging puck may have multiple coils arranged in a ring.

The wireless power receiving device may have an elongated magnetic core such as a C-shaped core with pillar-shaped protrusions that protrude orthogonally from the elongated magnetic core at opposing ends of the elongated magnetic core. First and second coils may be formed on the protrusions and a third coil may be formed between the first and second coils. The coils of the wireless power receiving device may be configured to receive magnetic flux emitted by a pair of the coils in the wireless charging puck.

DETAILED DESCRIPTION

A wireless power system includes a wireless power transmitting device such as a wireless charging mat or wireless charging puck. The wireless power transmitting device wirelessly transmits power to a wireless power receiving device such as a wristwatch, cellular telephone, tablet computer, laptop computer, or other electronic equipment. The wireless power receiving device uses power from the wireless power transmitting device for powering the device and for charging an internal battery.

The wireless power transmitting device communicates with the wireless power receiving device and obtains information on the characteristics of the wireless power receiving device. In some embodiments, the wireless power transmitting device has multiple power transmitting coils. In such embodiments, the wireless power transmitting device uses information from the wireless power receiving device and/or measurements made in the wireless power transmitting device to determine which coil or coils in the transmitting device are magnetically coupled to wireless power receiving devices. Coil selection is then performed in the wireless power transmitting device. Wireless power is transmitted from the wireless power transmitting device to the wireless power receiving device using selected coil(s) to charge a battery in the wireless power receiving device and/or to power other load circuitry.

Figure 1:
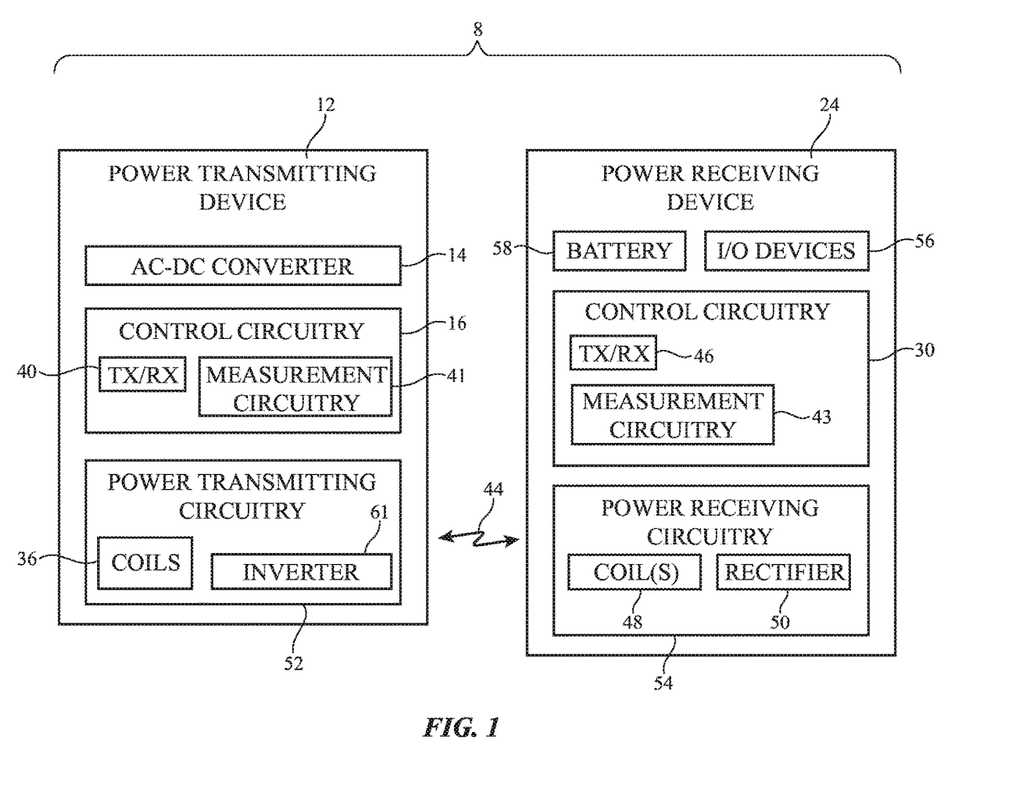
FIG. 1 is a schematic diagram of an illustrative wireless charging system that includes a wireless power transmitting device and a wireless power receiving device in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data, processing user input, handling negotiations between devices 12 and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitting device 12 is a wireless charging mat or wireless charging puck are sometimes described herein as an example.

Power receiving device 24 may be a portable electronic device such as a wristwatch, a cellular telephone, a laptop computer, a tablet computer, an accessory such as an earbud, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from transistors) that is turned on and off based on control signals provided by control circuitry 16 to create AC current signals through one or more wireless power transmitting coils such as transmit coils 36. Coils 36 may be arranged in a planar coil array (e.g., in configurations in which device 12 is a wireless charging mat) or may be arranged to form a cluster of coils (e.g., in configurations in which device 12 is a wireless charging puck). In some arrangements, device 12 may have only a single coil. In other arrangements, a puck or other wireless transmitting device may have two or more coils, three or more coils, four or more coils, or six or more coils.

As the AC currents pass through one or more coils 36, alternating-current electromagnetic (e.g., magnetic) fields (signals 44) are produced that are received by one or more corresponding receiver coils such as coil(s) 48 in power receiving device 24. Device 24 may have a single coil 48, at least two coils 48, at least three coils 48, at least four coils 48, or other suitable number of coils 48. When the alternating-current electromagnetic fields are received by coil(s) 48, corresponding alternating-current currents are induced in coil(s) 48. Rectifier circuitry such as rectifier 50, which contains rectifying components such as synchronous rectification metal-oxide-semiconductor transistors arranged in a bridge network, converts received AC signals (received alternating-current signals associated with electromagnetic signals 44) from coil(s) 48 into DC voltage signals for powering device 24.

The DC voltage produced by rectifier 50 (sometime referred to as rectifier output voltage Vrect) can be used in charging a battery such as battery 58 and can be used in powering other components in device 24. For example, device 24 may include input-output devices 56 such as a display, touch sensor, communications circuits, audio components, sensors, light-emitting diode status indicators, other light-emitting and light detecting components, and other components and these components (which form a load for device 24) may be powered by the DC voltages produced by rectifier 50 (and/or DC voltages produced by battery 58).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions.

It is desirable for power transmitting device 12 and power receiving device 24 to be able to communicate information such as received power, states of charge, and so forth, to control wireless power transfer. However, the above-described technology need not involve the transmission of personally identifiable information in order to function. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Control circuitry 16 has external object measurement circuitry 41 that may be used to detect external objects on the charging surface of device 12 (e.g., on the top of a charging mat or, if desired, to detect objects adjacent to the coupling surface of a charging puck). Circuitry 41 can detect foreign objects such as coils, paper clips, and other metallic objects and can detect the presence of wireless power receiving devices 24 (e.g., circuitry 41 can detect the presence of one or more coils 48). During object detection and characterization operations, external object measurement circuitry 41 can be used to make measurements on coils 36 to determine whether any devices 24 are present on device 12.

In an illustrative arrangement, measurement circuitry 41 of control circuitry 16 contains signal generator circuitry (e.g., oscillator circuitry for generating AC probe signals at one or more probe frequencies, a pulse generator that can create impulses so that impulse responses can be measured to gather inductance information, Q-factor information, etc.) and signal detection circuitry (e.g., filters, analog-to-digital converters, impulse response measurement circuits, etc.). During measurement operations, switching circuitry in device 12 may be adjusted by control circuitry 16 to switch each of coils 36 into use. As each coil 36 is selectively switched into use, control circuitry 16 uses the signal generator circuitry of signal measurement circuitry 41 to apply a probe signal to that coil while using the signal detection circuitry of signal measurement circuitry 41 to measure a corresponding response. Measurement circuitry 43 in control circuitry 30 and/or in control circuitry 16 may also be used in making current and voltage measurements.

Figure 2:
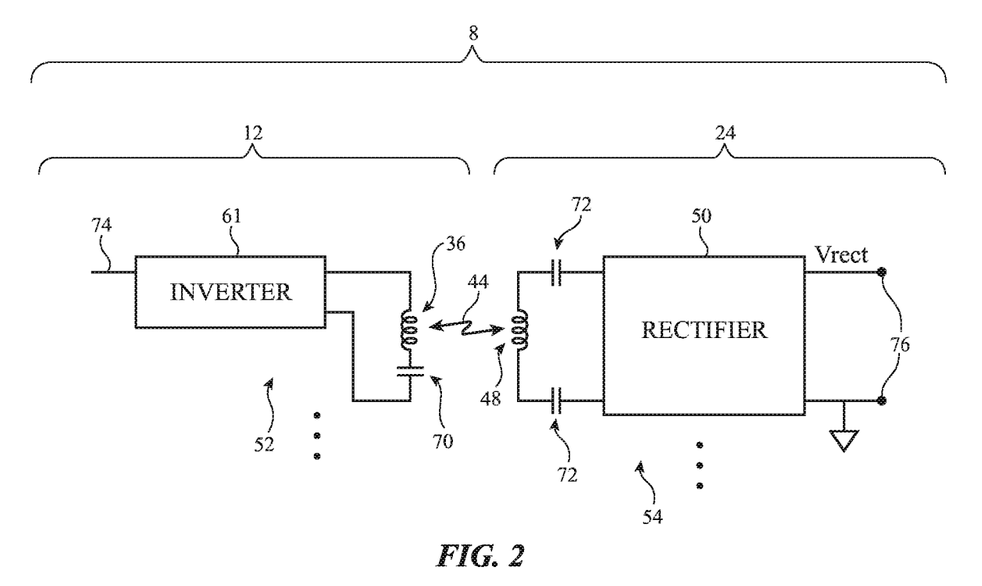
FIG. 2 is a circuit diagram of wireless power transmitting and receiving circuitry in accordance with an embodiment.

FIG. 2 is a circuit diagram of illustrative wireless charging circuitry for system 8. As shown in FIG. 2, circuitry 52 may include inverter circuitry such as one or more inverters 61 or other drive circuitry that produces wireless power signals that are transmitted through an output circuit that includes one or more coils 36 and capacitors such as capacitor 70. In some embodiments, device 12 may include multiple individually controlled inverters 61, each of which supplies drive signals to a respective coil 36. In other embodiments, an inverter 61 is shared between multiple coils 36 using switching circuitry.

During operation, control signals for inverter(s) 61 are provided by control circuitry 16 at control input 74. A single inverter 61 and single coil 36 is shown in the example of FIG. 2, but multiple inverters 61 and multiple coils 36 may be used, if desired. In a multiple coil configuration, switching circuitry can be used to couple a single inverter 61 to multiple coils 36 and/or each coil 36 may be coupled to a respective inverter 61. During wireless power transmission operations, transistors in one or more selected inverters 61 are driven by AC control signals from control circuitry 16. This causes the output circuit formed from selected coil 36 and capacitor 70 to produce alternating-current electromagnetic fields (signals 44) that are received by wireless power receiving circuitry 54 using a wireless power receiving circuit formed from one or more coils 48 and one or more capacitors 72 in device 24. Rectifier circuitry (e.g., one or more rectifiers 50) converts received power from AC to DC and supplies a corresponding direct current output voltage Vrect across rectifier output terminals 76 for powering load circuitry in device 24 (e.g., for charging battery 58, for powering a display and/or other input-output devices 56, and/or for powering other components). A single coil 48 or multiple coils 48 may be included in device 24. In configurations with multiple coils 48, switching circuitry may be used to selectively couple one or more desired coils 48 to a rectifier and/or multiple rectifiers may be used.

Figure 3:
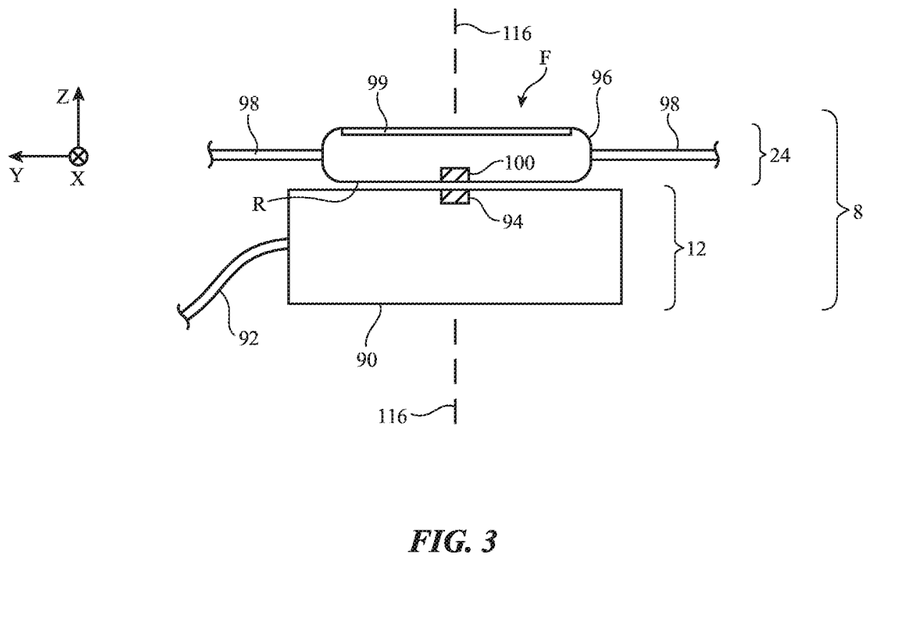
FIG. 3 is a side view of an illustrative wireless power transmitting device such as a wireless charging puck and a corresponding wireless power receiving device such as a wristwatch in accordance with an embodiment.

FIG. 3 is a cross-sectional side view of system 8 in an illustrative configuration in which wireless power transmitting device 12 is a wireless charging puck and in which wireless power receiving device 24 is a wristwatch. Device 12 has housing 90 (e.g., a puck housing formed form polymer, other dielectric material, and/or other materials). Cable 92 may be coupled to housing 90 and may provide power to device 12. In some configurations, power may be provided by an internal battery. A magnet such as magnet 94 may be mounted in housing 90 to help align and secure device 12 to device 24.

Device 24 may have a housing such as housing 96. Wrist band 98 (e.g., a wristwatch strap) may be coupled to housing 96. Housing 96 and device 24 may have opposing front and rear faces such as front face F and rear face R. Display 99 may be formed on front face F of housing 96 and device 24 and may lie in a plane that is perpendicular to axis 116 (e.g., a plane such as the X-Y plane of FIG. 3 that is parallel to the planes including front face F and rear face R of housing 96). A magnet such as magnet 100 (or magnetic material such as an iron bar or other magnetic material) may be mounted in housing 96. When devices 12 and 24 are placed adjacent to each other, magnetic attachment components such as magnets 94 and 100 may hold devices 12 and 24 together. This allows coil(s) 36 in housing 90 to transmit wireless power to coil(s) 48 in housing 96.

Figure 4:
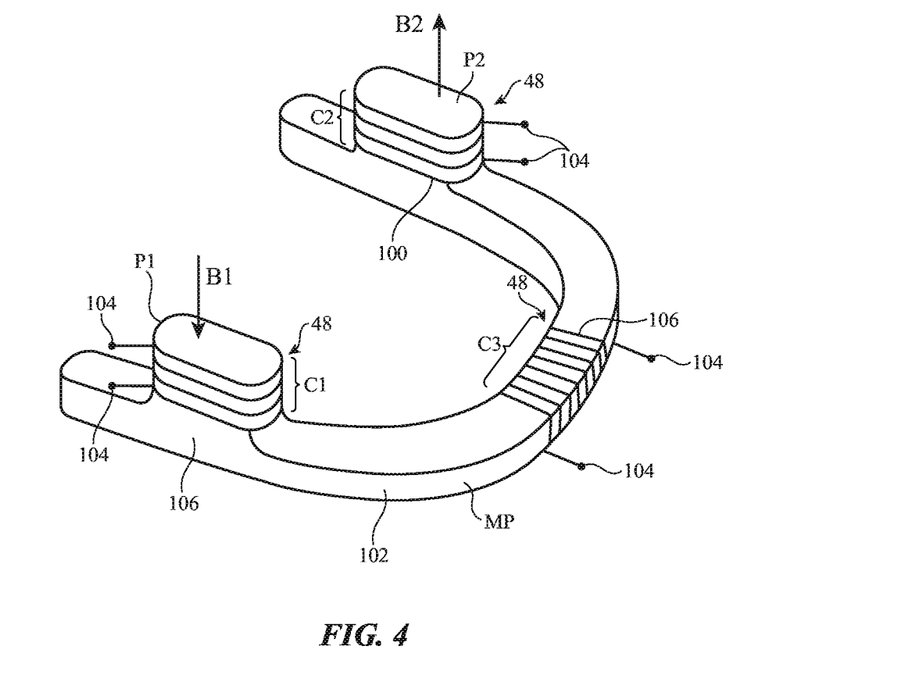
FIG. 4 is a perspective view of an illustrative curved elongated magnetic core with three associated coils in accordance with an embodiment.

The coil(s) in devices 12 and/or 24 may have any suitable number of turns of wire. The coils may be formed from turns of wire wrapped around cores made of iron, ferrite, or other magnetic material. A perspective view of an illustrative magnetic core and associated coils formed from wire wrapped around the magnetic core is shown in FIG. 4. The magnetic core and coils of FIG. 4 may be used in system 8 (e.g., to form coils 48 in device 24).

As shown in FIG. 4, core 102 may have an elongated shape and may lie in a plane (e.g., the X-Y plane of FIG. 4, which is parallel to the plane in which front face F and display 99 of FIG. 3 lie and which is parallel to the plane in which rear face R lies). Portions of the elongated core may protrude vertically (see, e.g., the protrusions forming pillars P1 and P2, which protrude orthogonally from the elongated core and therefore extend perpendicular to the X-Y plane along dimension Z).

Multiple coils 48 can be wrapped around core 102. Core 102 is formed from magnetic material and has a crescent-shaped main portion MP (sometimes referred to as an elongated C-shaped core, curved elongated core, curved elongated magnetic core, curved elongated core structure, horseshoe core, etc.). Crescent-shaped main portion MP is curved (e.g., main portion MP is bent and therefore curved along its length). A pair of vertically extending protrusions such as vertically extending pillars P1 and P2 extend orthogonally from opposing ends of main portion MP (e.g., the elongated core has a pair of protrusions that extend orthogonally with respect to the longitudinal dimension of the elongated core). In configurations in which device 24 is a wristwatch, pillars P1 and P2 may extend perpendicularly with respect to the plane containing the display of device 24 (e.g., the wristwatch may have opposing front and rear faces, may have a display that lies in a plane on the front face, and may contain a core 102 that lies between the front and rear faces and has pillars P1 and P2 with longitudinal axes that are perpendicular to the plane of the display). With this type of arrangement, pillars P1 and P2 extend along pillar axes that are parallel to axis 116 of FIG. 3. Core 102 may have a circular cross-sectionals profile, a rectangular cross-sectional profile, or other suitable cross-sectional shape. The footprint (outline when viewed from above) of core 102 may be C-shaped, L-shaped, straight, curved, a shape with one or more straight segments and/or one or more curved segments, and/or other suitable shapes.

Coils C1, C2, and C3 may be formed from multiple turns of wire 106. Coils C1 and C2 may be wrapped around pillars P1 and P2 of core 102, respectively. Coil terminals 104 may be coupled to rectifier circuitry in device 24. In some configurations, two or more coils may be coupled in series (e.g., using switching circuitry or hardwired signal paths). For example, coils C1 and C2 may be coupled in series and may operate electrically as a single coil with terminals coupled to rectifier 50. The winding orientations of coils C1 and C2 in this type of configuration may be complementary (e.g., coil C1 may use clockwise windings and coil C2 may use counterclockwise windings). In this way, current in the combined C1/C2 coil is generated as magnetic flux passes into pillar P1 (see, e.g., magnetic field B1) and exits pillar P2 (see, e.g., magnetic field B2). Coil C3 may be formed from turns of wire 106 that are wrapped around the same common magnetic core as coils C1 and C2 (e.g., magnetic core 102). Core C3 may be used to receive wireless power signals in configurations in which coils C1 and C2 are not well positioned to receive magnetic flux from device 12.

Figure 5:
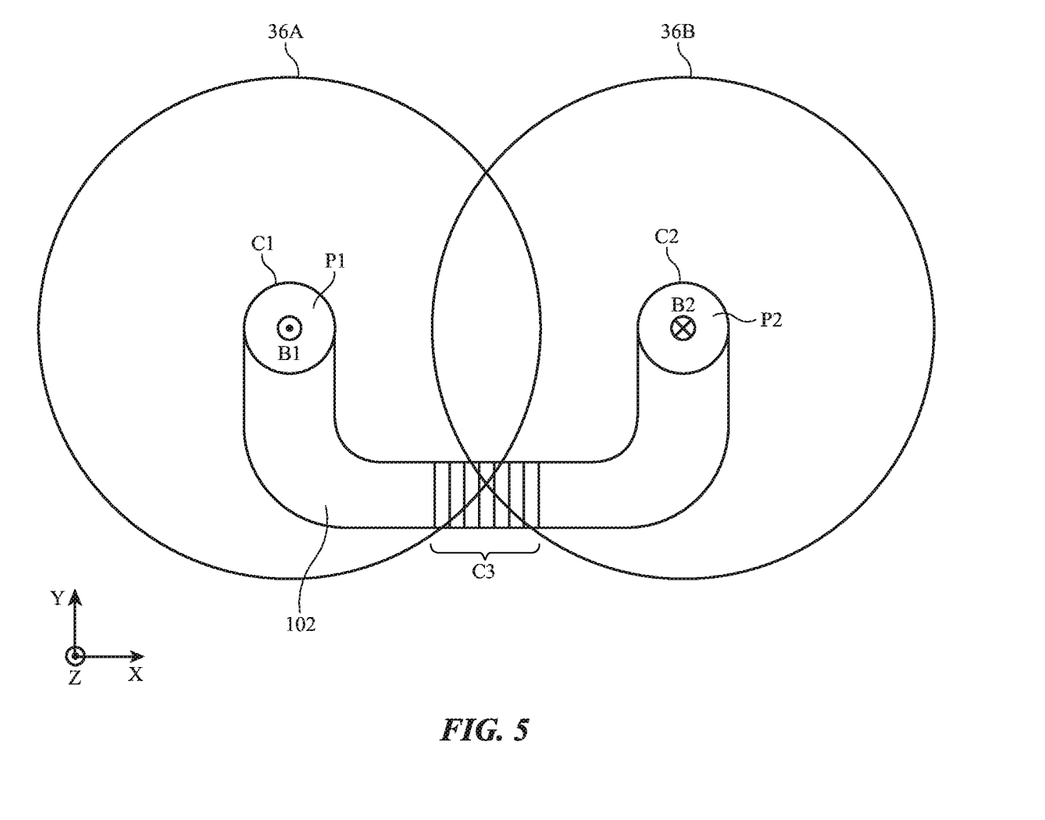
FIG. 5 is a top view of an illustrative pair of wireless power transmitting coils in a wireless power transmitting device overlapped by an illustrative magnetic core and three wireless power receiving coils in a wireless power receiving device in accordance with an embodiment.

FIG. 5 is a top view of magnetic coil core 102 and coils C1, C2, and C3 in an illustrative configuration in which device 24 has been placed flat on a charging surface of a wireless power transmitting device that has at least two wireless power transmitting coils 36A and 36B. Device 24 may be, for example, a wristwatch placed rear face down on the charging surface of a charging mat. In the example of FIG. 5, core 102 is overlapping both of coils 36A and 36B, so transmitting device 12 can drive both of coils 36A and 36B. Device 12 may, for example, enhance power transfer efficiency by driving coils 36A and 36B 180° out of phase with respect to each other. When coils 36A and 36B are driven 180° out of phase, magnetic flux (see, e.g., magnetic field B1) will be generated in the center of coil 36A, will pass through coil C1 and pillar P1, will be guided through core 102 and coil C3, will pass through coil C2 and pillar P2, and will be received in the center of coil 36B (see, e.g., magnetic field B2). In this illustrative scenario, wireless power can be received using coils C1, C2, and C3.

Figure 6:
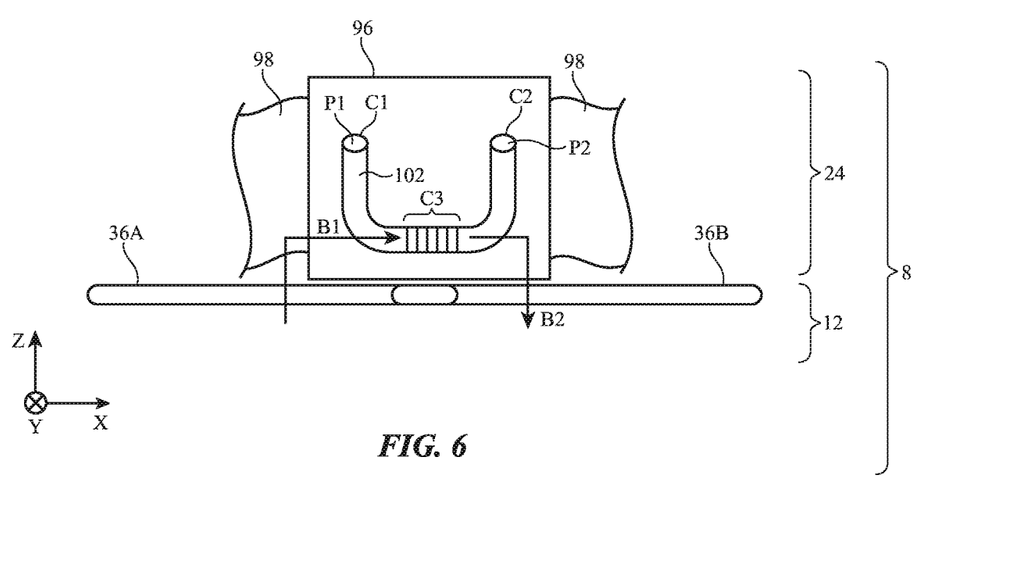
FIG. 6 is a side view of an illustrative wireless power system having a charging mat with multiple coils that is transmitting wireless power to a wristwatch device in accordance with an embodiment.

FIG. 6 is a side view of magnetic coil core 102 and coils C1, C2, and C3 in an illustrative configuration in which device 24 has been placed on its edge on a charging surface of a wireless power transmitting device that has at least two wireless power transmitting coils 36A and 36B. Device 24 may be, for example, a wristwatch resting on its left or right edge on the charging surface of a charging mat and supported in this position by band 98. In the example of FIG. 6, core 102 is overlapping both of coils 36A and 36B, so device 12 can drive both of coils 36A and 36B (e.g., coils 36A and 36B may be driven 180° out of phase to enhance power transmission efficiency). When coils 36A and 36B are driven 180° out of phase, magnetic flux (see, e.g., magnetic field B1) will be generated in the center of coil 36A, will pass through coil C3 and portions of core 102, and will be received in the center of coil 36B (see, e.g., magnetic field B2). In this illustrative scenario, coils C1 and C2 may not receive as much magnetic flux as in the scenario of FIG. 5, but due to the presence of laterally oriented coil (solenoid) C3, wireless power transfer may still be possible even though device 24 is resting on the edge of housing 96.

Figure 7:
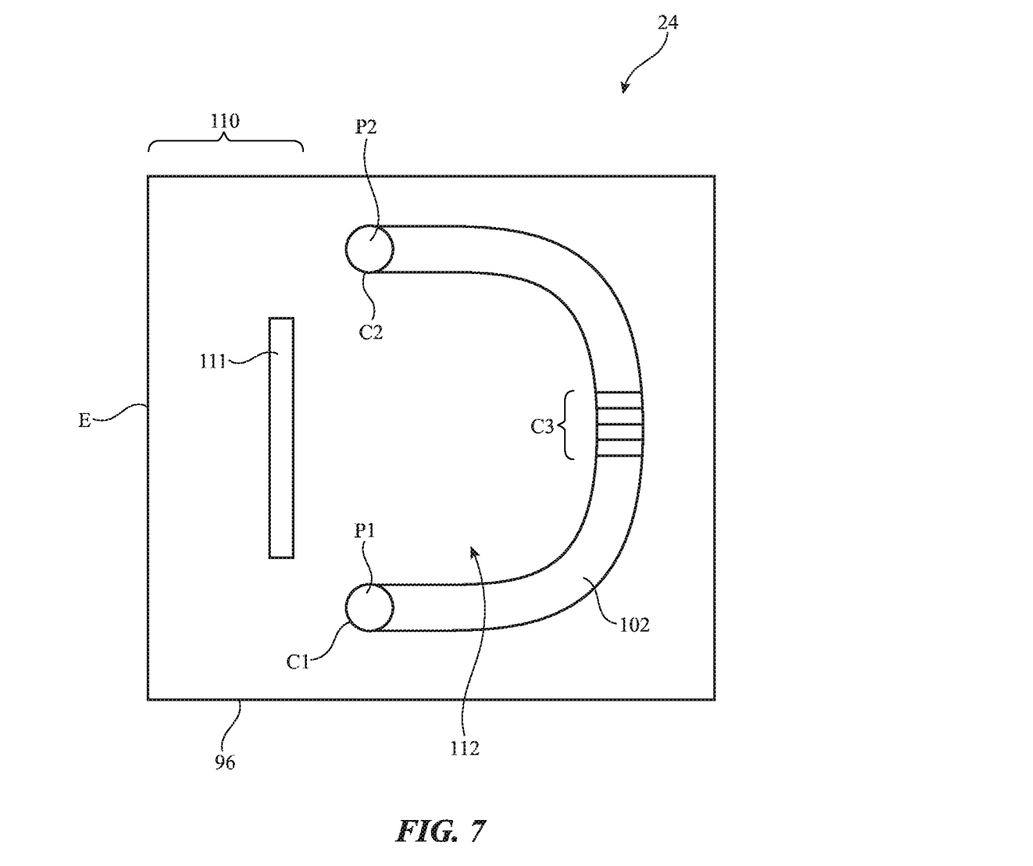
FIG. 7 is a top view of an illustrative wireless power receiving device such as a wristwatch device with a C-shaped magnetic core having three coils in accordance with an embodiment.

As shown in the top view of illustrative device 24 of FIG. 7, core 102 may be located closer to one peripheral edge of housing 96 (e.g., the right-hand edge) than another (e.g., the left-hand edge). This positioning of core 102 may help create space (see, e.g., antenna volume 110) within the interior of housing 96 for antennas (e.g., space for one or more antenna resonating elements such as antenna resonating element 111 and associated antenna ground structures for forming cellular telephone antennas, near-field communications antennas, millimeter wave antennas, wireless local area network antennas, and/or other radio-frequency communications circuitry). Antenna resonating element 111 may include metal traces and/or other conductive structures for forming one or more patch antennas, inverted-F antennas, loop antennas, monopoles, dipoles, etc. Control circuitry 16 may include radio-frequency transceiver circuitry that operates at communications frequencies of 700 MHz to 2700 MHz, at frequencies above 2700 MHz (e.g., at local area network frequencies of 2.4 GHz and/or 5 GHz), at frequencies above 5 GHz, at millimeter wave frequencies, or other suitable communications frequencies. These frequencies, which are above 1 Mhz, may differ from the frequency of the wireless power signals transmitted from device 12 to device 24 (which may be, for example, less than 1 MHz, less than 500 kHz, etc. The use of a C-shape (crescent shape) for core 102 may also help create interior volume (see, e.g., area 112) for battery 58, input-output devices 56, and other electrical components in housing 96. The use of communications frequencies for the antenna(s) in antenna volume 110 that differ from the wireless power frequencies used in receiving wireless power with the coil structures of device 12 (e.g., coils C1, C2, and C3 in the example of FIG. 7) may help avoid interference.

Figure 8:
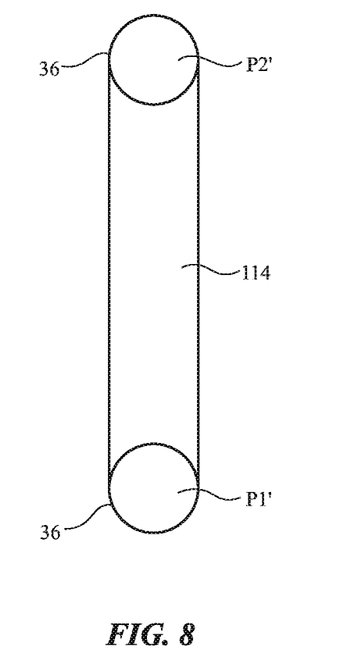
FIG. 8 is a top view of an illustrative magnetic core for a wireless power transmitting device with coils at opposing ends of the core in accordance with an embodiment.

Device 12 may have one or more coils 36 for transmitting wireless power signals to device 24. A single magnetic core may be shared between two or more of these coils or each coil 36 may optionally have a separate magnetic core. In the example of FIG. 8, transmitting device magnetic core 114 for device 12 has opposing first and second ends with vertically extending protrusions forming pillars P1' and P2', each with a respective one of a pair of first and second coils 36. Magnetic core 114 and coils 36 of FIG. 8 may, as an example, be mounted in a wireless charging puck housing (see, e.g., housing 90 of FIG. 3). The spacing between coils 36 of FIG. 8 may be configured to match the spacing between coils C1 and C2 on core 102 of device 24 (see, e.g., FIG. 7). In this way, magnetic flux can be efficiently coupled out of a first of coils 36 into coil C1 and, after being guided through core 102, may be efficiently coupled out of coil C2 into the second of coils 36.

It may be desirable to permit housing 96 and housing 90 to rotate with respect to each other (e.g., about a rotational axis aligned with axis 116 of FIG. 3). For example, there may be a single magnetic attachment structure (e.g., magnet 94) in housing 90 and a single magnetic attachment structure (e.g., magnet 100) in housing 96. These magnetic elements may be located in the centers of housing 96 and housing 90. This helps couple and laterally align housings 96 and 90, but may not ensure a desired rotational alignment between housing 90 and housing 96 about axis 116.

To help promote electromagnetic coupling (e.g., magnetic field coupling) between coils 36 and coils 48 (e.g., coils C1 and C2 of FIG. 7 and/or other coils 48 in device 24), it may be desirable to provide three or more coils 36 in device 12. These coils may share a common magnetic core and/or multiple magnetic cores may be provided to accommodate multiple coils 36.

Figure 9:
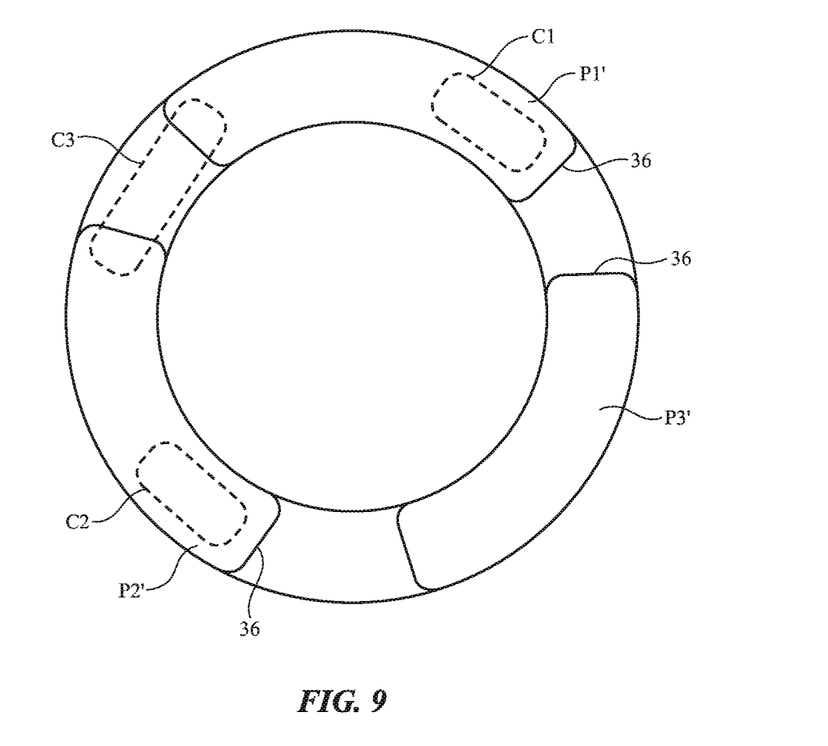
FIG. 9 is an illustrative magnetic core with three coils arranged in a ring for a wireless power transmitting device in accordance with an embodiment.

FIG. 9 is a top view of coils 36 for device 12 in an illustrative arrangement in which device 12 has three of coils 36. Coils 36 may be formed, respectively on vertically extending protrusions forming vertically extending pillars P1', P2', and P3' of shared annular (ring-shaped) magnetic core 114 (as an example). If desired, other core structures may be used (e.g., each coil may have its own core, core 114 may be segmented and/or may have different shapes, etc.). In an embodiment, any adjacent pair of coils 36 can be used to drive signals into and out of respective coils 48. Due to the use of three coils 36 that are spaced apart by 120°, the alignment between coils 48 and coils 36 can accommodate rotational misalignment within +/−60°.

Figure 10:
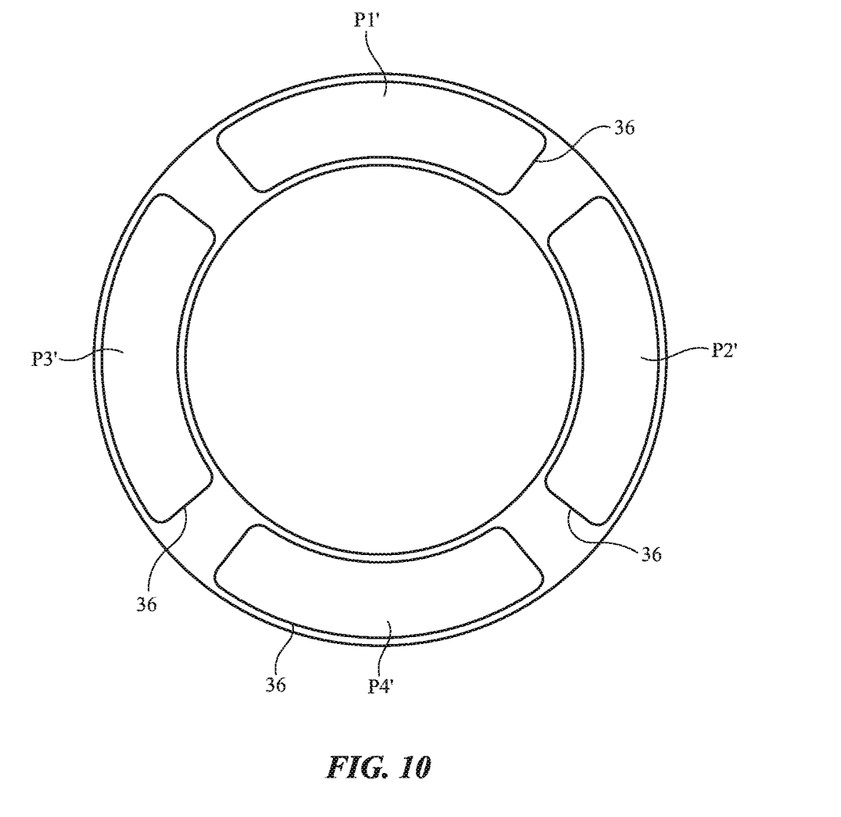
FIG. 10 is an illustrative magnetic core with four coils arranged in a ring for a wireless power transmitting device in accordance with an embodiment.

FIG. 10 is a top view of coils 36 for device 12 showing how device 12 may have four of coils 36. Coils 36 may be formed, respectively on vertically extending protruding portions of shared annular (ring-shaped) magnetic core 114 that form pillars P1', P2', P3', and P4'. Other core structures may be used, if desired. For example, each coil 36 may have its own core, core 114 may be segmented and/or may have different shapes, etc.

Figure 11:
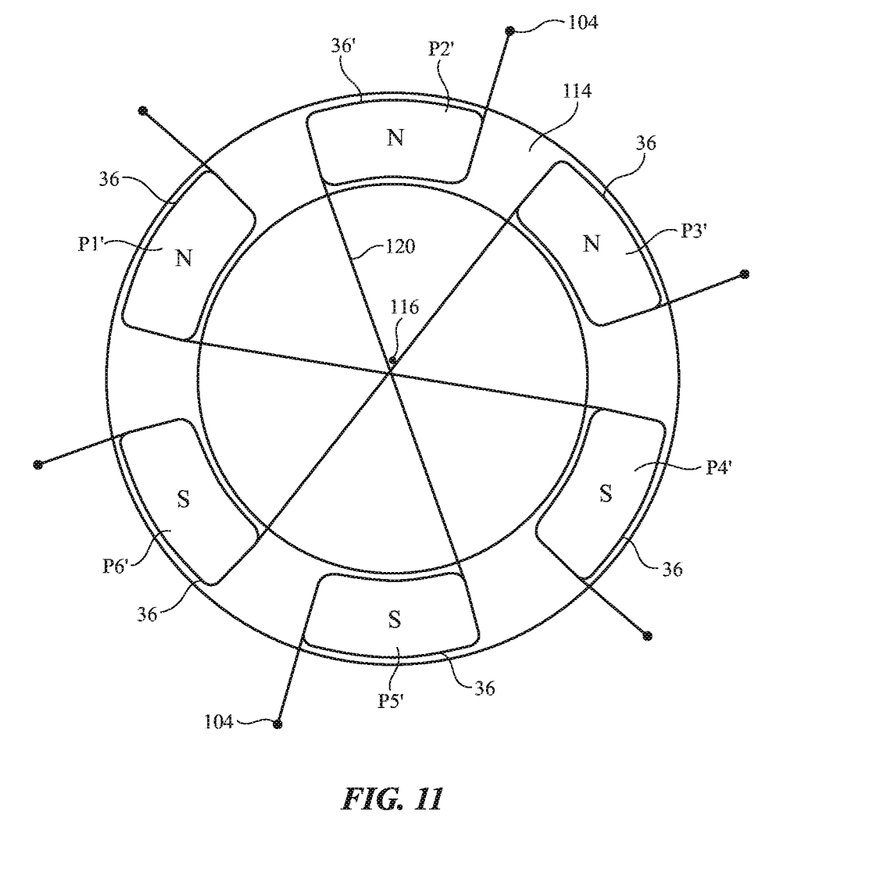
FIG. 11 is an illustrative magnetic core with six coils arranged in a ring for a wireless power transmitting device in accordance with an embodiment.

In the example of FIG. 11, device 12 has six coils 36. Coils 36 may be formed, respectively, on vertically extending portions of shared annular (ring-shaped) magnetic core 114 that form pillars P1', P2', P3', P4', P5', and P6'. Other core structures may be used, if desired. For example, each coil 36 may have its own core, core 114 may be segmented and/or may have different shapes, etc. In an embodiment, any adjacent pair of coils 36 or, if desired, any pair of opposing coils 36, can be used in driving signals into and out of respective coils 48. Due to the use of four coils 36 each of which is spaced 90° from the next, the alignment between coils 48 and coils 36 can accommodate rotational misalignment within +/−45°.

As illustrated by the foregoing examples, rings 36 may be arranged in a cluster (e.g., in a layout such as a circular ring pattern or other suitable pattern) within device 12. Particularly in arrangements with larger numbers of coils 36, the cluster of coils 36 may allow some rotational freedom between devices 12 and 24 while still ensuring that satisfactory electromagnetic coupling between devices 12 and 24 may be achieved. Consider, as an example, the six-coil arrangement of FIG. 11. In this arrangement, coils 36 are evenly distributed around a circular ring-shaped magnetic core, so that coils 36 are spaced 60° apart from each other. The spacing between the coils of device 24 (e.g., the distance across the ring of FIG. 11) may match the spacing between coils 48 of device 24 (e.g., the spacing between coils C1 and C2 in FIG. 7). With the six-coil arrangement of FIG. 11, there are 6 different rotational positions (positions as housing 96 is rotated relative to housing 90 about rotational axis 116) in which a pair of coils 48 (e.g., coils C1 and C2 of FIG. 7) will align with a mating pair of opposing coils 36 in FIG. 11 (e.g., first and second coils 36 on opposing sides of core 114. As a result, the amount of potential rotational mismatch between coils 36 and coils 48 is never more than 30°.

During initial set-up operations, device 12 may use measurement circuitry 41 (and, if desired, measurement circuitry 43 may be used) to determine which of coils 36 can be satisfactorily used to transmit wireless power to coils 48. As an example, if coils C1 and C2 of device 24 overlap respective first and second opposing coils of device 12 such as coils 36' of FIG. 11, the wireless power transmitting circuitry of device 12 can be configured by circuitry 16 (e.g., using switching circuitry, inverter circuitry, etc.) to drive AC signals through those coils. The first and second coils 36' may be driven separately (e.g., a first of coils 36' may receive a first drive signal and a second of coils 36' may receive a second drive signal such as a drive signal that is 180° out of phase with respect to the first drive signal) or a hardwired connection may be formed between coils 36' that couples coils 36' in series.

For example, opposing coils may be electrically coupled using wires. As shown in FIG. 11, a pair of coils 36' on opposing sides of the ring of coils in device 12 may be electrically coupled using a wire such as wire 120. Wire 120 may couple a first of coils 36' to a second of coils 36'. With this arrangement, a first of coils 36' has a terminal that is coupled to wire 120 and a second of coils 36' has a terminal that is coupled to wire 120. The first and second coils 36' each have one free terminal 104 that is not connected to wire 120. The winding sense of the first and second coils may be reversed with respect to each other (e.g., the first coil 36' may be have turns that are wound about pillar P2' clockwise and the second coil 36' may have turns that are wound around opposing pillar P5' counterclockwise). Because coils 36' are coupled in series in this example, current that is applied to the free terminal of the first coil 36' flows through the first coil 36', through wire 120, and through the second coil 36' to the free terminal of the second coil 36'. The clockwise orientation of the windings for the first coil 36' creates magnetic flux from the first coil 36' that has a first orientation (called north N in FIG. 11, which may be out of the page of FIG. 11). At the same time, the counterclockwise orientation of the windings for the second coil 36' creates magnetic flux from the second coil 36' that has an opposing second orientation (called south S in FIG. 11, which may be into the page of FIG. 11). Coils 48 (e.g., coils C1 and C2 on core 102 of FIG. 7) likewise have windings with opposing orientations (giving coil C1 a south orientation, for example, and giving coil C2 a north orientation). As a result, magnetic flux is emitted from the first coil 36' into coil C1, passes through core 102, and passes out of coil C2 into the second coil 36'.

Figure 12:
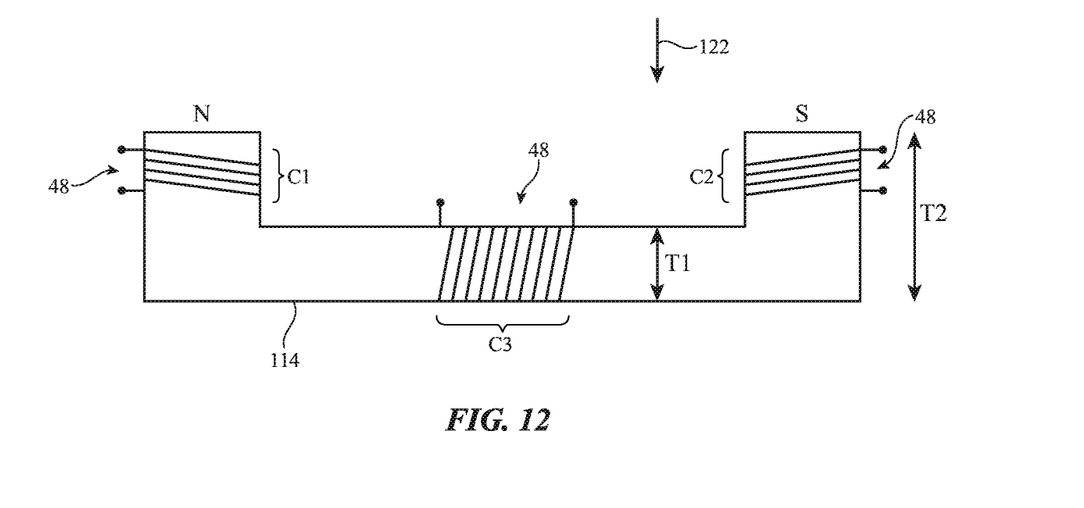
FIGS. 12 and 13 are side views of illustrative elongated magnetic cores with wireless power receiving coils for a wireless power receiving device in accordance with an embodiment.
Figure 13:
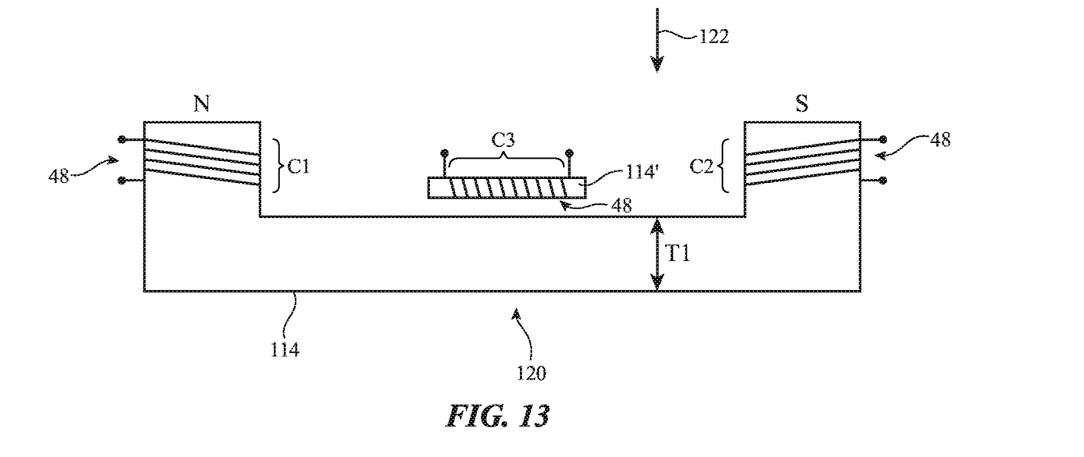

FIGS. 12 and 13 are side views of coils 48 in device 24. In the example of FIG. 12, coils C1, C2, and C3 are formed on a common magnetic core 114. Core 114 may have a thickness T1 of about 0.5 mm or other suitable thickness. The height T2 of core 114 at pillars P may be about 1.5 mm or other suitable thickness. The width of core 114 (e.g., the lateral dimension of core 114 into the page in the example of FIG. 12) may be about 2.5 mm or other suitable size. Core 114 may be formed from magnetic material such as ferrite or other magnetic material. Core 114 may have an elongated shape that is straight or curved when viewed from above in direction 122 (e.g., to form a horseshoe shape, sometimes referred to as a C shape, or other suitable magnetic core shape). In the example of FIG. 13, coil C3 has been formed on magnetic core 114', which is separate from main magnetic core 114 of FIG. 13. In this type of arrangement, coil C3 may be located farther from internal components in region 120 in which eddy currents may be induced by current flow through coil C3 and associated electromagnetic emissions. The location of magnetic core 114' of FIG. 13 may also allow core 114 to serve as electromagnetic shielding (e.g., core 114 may help block magnetic fields from coil C3 that might otherwise induce eddy currents in components located in region 120).

The foregoing is merely illustrative and various modifications can be made to the described embodiments. The foregoing embodiments may be implemented individually or in any combination.

What is claimed is:

1. A wireless power receiving device configured to wirelessly receive power during wireless power transmission from a wireless power transmitting device, comprising:

a display;
electrical components;
an elongated magnetic core;
first and second coils at opposing first and second ends of the elongated magnetic core, wherein the elongated magnetic core has first and second pillars protruding from the elongated magnetic core at the first and second ends, respectively, and orthogonal to the display;
a third coil wrapped around the elongated magnetic core at a location between the first and second coils; and
rectifier circuitry that receives wireless power using the first, second, and third coils and that supplies a voltage to the electrical components.

2. The wireless power receiving device of claim 1 wherein the elongated magnetic core is curved along its length.

3. The wireless power receiving device of claim 2 further comprising:
a housing in which the elongated magnetic core is mounted
the display being disposed on a front face of the housing.

4. The wireless power receiving device of claim 3 wherein the elongated core has a C shape, wherein the first coil comprises wire wrapped around the first pillar, and wherein the second coil comprises wire wrapped around the second pillar.

5. The wireless power receiving device of claim 4 wherein the first and second coils are coupled in series, wherein the wire wrapped around the first pillar is wrapped clockwise around the first pillar, and wherein the wire wrapped around the second pillar is wrapped counterclockwise around the second pillar.

6. The wireless power receiving device of claim 3 further comprising:
a wrist band coupled to the housing.

7. The wireless power receiving device of claim 6, wherein the first and second pillars extend perpendicular to the display.

8. The wireless power receiving device of claim 1 further comprising an antenna resonating element configured to transmit wireless signals at frequencies above 1 MHz, wherein the first and second coils are configured to receive wireless power signals at frequencies less than 1 MHz.

9. The wireless power receiving device of claim 1, wherein the wireless power receiving device comprises a wristwatch.

10. A wireless power receiving device configured to wirelessly receive power during wireless power transmission from a wireless power transmitting device, comprising:
a display;
an elongated core of magnetic material having opposing first and second ends, wherein the elongated core has a curved shape and lies in a plane, the elongated core has first and second pillars at the first and second ends, respectively, and the first and second pillars extend perpendicular to the plane and the display;
first, second, and third coils wrapped around the elongated core, the first and second coils being wrapped around the elongated core at the first and second ends, respectively; and
rectifier circuitry that receives wireless power using the first, second, and third coils.

11. The wireless power receiving device of claim 10 further comprising:
a housing in which the elongated core is mounted, wherein the housing has opposing front and rear faces wherein the display is disposed on the front face, wherein the elongated core has opposing first and second ends, wherein the first coil has wire wrapped around the elongated core at the first end and wherein the second coil has wire wrapped around the elongated core at the second end.

12. The wireless power receiving device of claim 11, wherein the first coil is on the first pillar and wherein the second coil is on the second pillar.

13. The wireless power receiving device of claim 12, wherein the plane in which the elongated core lies is parallel to the front face.

14. The wireless power receiving device of claim 10 wherein the elongated core is curved along its length.

15. The wireless power receiving device of claim 14 wherein the elongated core has a C shape.

16. The wireless power receiving device of claim 10, wherein the wireless power receiving device comprises a wristwatch.

17. A wireless power receiving device configured to receive wireless power from a wireless charging puck that includes wireless power transmitting circuitry configured to transmit the wireless power using at least one wireless power transmission coil, the wireless power receiving device comprising:
a wristwatch housing;
a display mounted to the wristwatch housing;
a magnet in the wristwatch housing that is configured to magnetically hold the puck housing against the wristwatch housing;
a wristband coupled to the wristwatch housing;
an elongated magnetic core that is bent along its length; and
first and second wireless power receiving coils formed from turns of wire at opposing first and second ends of the elongated magnetic core, wherein the first and second wireless power receiving coils are configured to receive the wireless power from the at least one wireless power transmission coil, the elongated magnetic core has first and second pillars that protrude from the elongated magnetic core at the first and second ends, respectively, and the first and second pillars extend perpendicular to the display.

18. The wireless power receiving device of claim 17 wherein the at least one wireless power transmission coil comprises four wireless power transmission coils equally spaced in a ring and wherein the first and second wireless power receiving coils are formed on the first and second pillars, respectively.

19. The wireless power receiving device of claim 18 wherein the elongated magnetic core has a C shape and lies in a plane that is parallel to the display.

20. The wireless power receiving device of claim 18 further comprising a third power receiving coil on the elongated metal core between the first and second wireless power receiving coils.

* * * * *